(12) United States Patent
Wang et al.

(10) Patent No.: US 12,710,515 B2
(45) Date of Patent: Aug. 18, 2026

(54) SHARED READOUT MULTIPLE SPAD EVENT COLLISION RECOVERY FOR LIDAR

(71) Applicant: Samsung Electronics Co., Ltd., Suwon-si (KR)

(72) Inventors: Yibing Michelle Wang, Temple City, CA (US); Chunji Wang, Azusa, CA (US); Hongyu Wendy Wang, South Pasadena, CA (US); Tze-Ching Fung, Diamond Bar, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1074 days.

(21) Appl. No.: 17/807,686

(22) Filed: Jun. 17, 2022

(65) Prior Publication Data

US 2023/0221418 A1 Jul. 13, 2023

Related U.S. Application Data

(60) Provisional application No. 63/298,988, filed on Jan. 12, 2022.

(51) Int. Cl.

| | |
|---|---|
| ***G01S 7/48*** | (2006.01) |
| ***G01S 7/481*** | (2006.01) |
| ***G01S 7/4863*** | (2020.01) |
| ***G01S 7/4865*** | (2020.01) |

(52) U.S. Cl.

CPC .......... *G01S 7/4865* (2013.01); *G01S 7/4816* (2013.01); *G01S 7/4863* (2013.01)

(58) Field of Classification Search

USPC .......................................................... 356/5.01

See application file for complete search history.

(56) References Cited

U.S. PATENT DOCUMENTS

| | | | |
|---|---|---|---|
| 9,952,323 | B2 | 4/2018 | Deane |
| 10,132,921 | B2 | 11/2018 | Dutton et al. |
| 10,497,738 | B2 | 12/2019 | Bulteel |
| 10,715,754 | B2 | 7/2020 | Moore et al. |
| 10,802,120 | B1 | 10/2020 | LaChapelle et al. |
| 10,845,467 | B2 | 11/2020 | Axelsson |
| 10,852,401 | B2 | 12/2020 | Koyama et al. |

(Continued)

FOREIGN PATENT DOCUMENTS

| | | |
|---|---|---|
| CN | 112255635 A | 1/2021 |
| CN | 113759388 A | 12/2021 |

(Continued)

OTHER PUBLICATIONS

US 10,830,888 B2, 11/2020, Shu et al. (withdrawn)

(Continued)

*Primary Examiner* — James R Hulka

(74) *Attorney, Agent, or Firm* — Womble Bond Dickinson (US) LLP

(57) ABSTRACT

The present disclosure relates to a method and system for time-of-flight detection. There may be two or more photodetectors in a photodetector circuit that capture photon activity. There is logic that processes the responses of the photodetectors and returns the leading edge of the arrival of the first photon and the leading edge of the arrival of the last photon, if at least two photons are received during an overlapping pulse width.

12 Claims, 9 Drawing Sheets

(56) References Cited

U.S. PATENT DOCUMENTS

| | | | | |
|---|---|---|---|---|
| 11,022,680 | B2 | 6/2021 | Hinderling et al. | |
| 11,245,404 | B2 * | 2/2022 | Dahle | H03L 7/18 |
| 11,740,334 | B2 * | 8/2023 | Patanwala | G01S 17/32 356/5.01 |
| 2015/0338270 | A1 * | 11/2015 | Williams | G01S 7/487 250/214.1 |
| 2017/0234973 | A1 * | 8/2017 | Axelsson | G01S 17/10 356/5.01 |
| 2017/0242106 | A1 * | 8/2017 | Dussan | G01S 7/4865 |
| 2019/0170855 | A1 | 6/2019 | Keller et al. | |
| 2019/0250257 | A1 | 8/2019 | Finkelstein et al. | |
| 2020/0103507 | A1 * | 4/2020 | Kirillov | G01S 17/42 |
| 2020/0116838 | A1 | 4/2020 | Erdogan et al. | |
| 2020/0264287 | A1 * | 8/2020 | Graefling | G01S 17/42 |
| 2020/0284883 | A1 * | 9/2020 | Ferreira | G01S 7/4815 |
| 2020/0400792 | A1 * | 12/2020 | Patanwala | G01S 7/4914 |
| 2021/0003677 | A1 * | 1/2021 | Maksymova | G01S 7/4865 |
| 2021/0088661 | A1 | 3/2021 | Hata et al. | |
| 2021/0133992 | A1 * | 5/2021 | Hristova | G06F 1/10 |
| 2021/0165079 | A1 | 6/2021 | Beuschel et al. | |
| 2021/0247499 | A1 * | 8/2021 | Zhu | G01S 7/4863 |
| 2021/0297084 | A1 * | 9/2021 | Dahle | H03L 7/0805 |
| 2021/0302553 | A1 | 9/2021 | Palubiak | |
| 2021/0341619 | A1 | 11/2021 | King et al. | |
| 2021/0377481 | A1 * | 12/2021 | Hsieh | H04N 25/79 |
| 2022/0018941 | A1 * | 1/2022 | Druml | G01S 7/4863 |
| 2022/0137191 | A1 * | 5/2022 | Lu | H01L 25/043 257/184 |
| 2022/0276355 | A1 * | 9/2022 | Li | G02B 6/4206 |
| 2024/0012143 | A1 * | 1/2024 | Weston | G01S 7/4811 |

FOREIGN PATENT DOCUMENTS

| | | | |
|---|---|---|---|
| CN | 113777582 | A | 12/2021 |
| EP | 3754367 | A1 | 12/2020 |

OTHER PUBLICATIONS

Wu, Jinyuan; “An FPGA Wave Union TDC for Time-of-Flight Applications”; 2009 IEEE Nuclear Science Symposium Conference Record; pp. 299-304.

Scott, Ryan; “Design of a Time-to-Digital Converter and Multi-Time-Gated SPAD Arrays Towards Biomedical Imaging Applications”; 2021; https://macsphere.mcmaster.ca/bitstream/11375/26864/2/Scott_Ryan_finalsubmission2021July_Masc.pdf; 156pp.

Venialgo, Esteban, et al.; “Toward a Full-Flexible and Fast-Prototyping TOF-PET Block Detector Based on TDC-on-FPGA”; IEEE Transactions on Radiation and Plasma Medical Sciences 3.5; 2018; pp. 538-548.

European Search Report for EP Application No. 22207970.9 dated May 19, 2023, 12 pages.

* cited by examiner

100
LIGHT SOURCE
102
104
EMITTED LIGHT
106
126
CONTROLLER
122
116
110
REFLECTED LIGHT
120
$f_{LENS}$
L(ROUND TRIP DISTANCE D=2L)
V(EXCESS BIAS -3V)
R(Q)
128
V(DIG)
130
V(OUT)
hv
V(hv~30V)
122
124
132
V(OUT)
131
133
V(DIG)

200
EVENT RATE
ToF
201
202
203
204
EVENT RATE
2x2 INDEPENDENT
201
2x2 COLLISION RECOVERY
202
EVENT RATE
2x2 OR
203
1x1 WITH x2 PITCH
204

Figure 3:
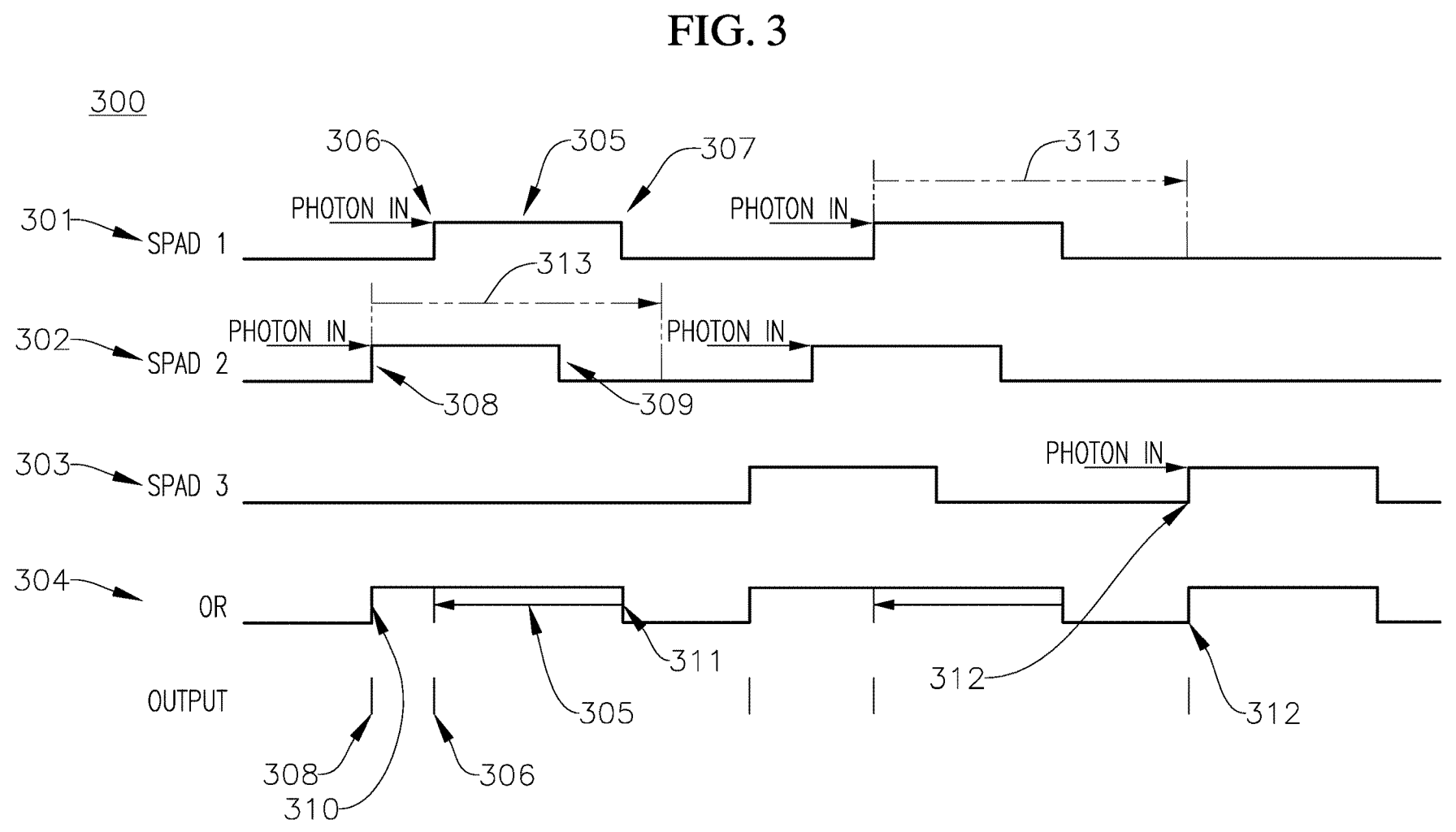

301 SPAD 1
302 SPAD 2
303 SPAD 3
304 OR
OUTPUT

PHOTON IN
PHOTON IN
PHOTON IN
PHOTON IN
PHOTON IN 305
306
307
308
309
310
311
312
313

Figure 5:
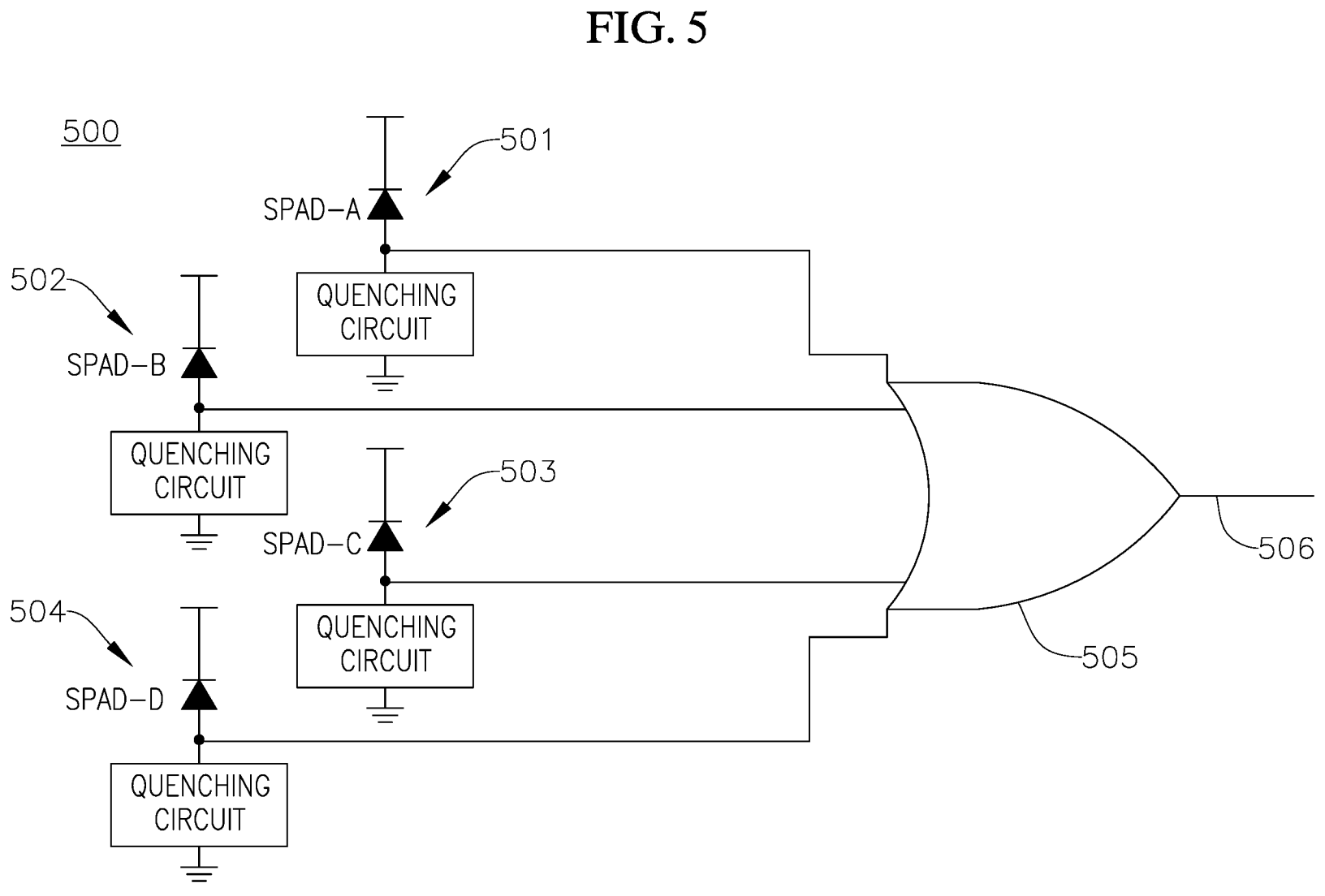

501
SPAD–A
QUENCHING CIRCUIT

502
SPAD–B
QUENCHING CIRCUIT

503
SPAD–C
QUENCHING CIRCUIT

504
SPAD–D
QUENCHING CIRCUIT

505

506

600
601
602
603
604
605
606
SPAD–A
SPAD–B
SPAD–C
SPAD–D
QUENCHING CIRCUIT
QUENCHING CIRCUIT
QUENCHING CIRCUIT
QUENCHING CIRCUIT 900
901
2x2 SPAD CIRCUIT
907
OUTPUT BUS
SPAD
Mq
ENBL
x4
PHOTODETECTORS
903
SEL
902
SPAD ARRAY
903
OUTPUT
DLL
PLL
904
TDC–RAISING
TDC–FALLING
TDC ARRAY
(RAISING/FALLING EDGE
TIME MANAGEMENT)
DIGITAL
TIME
STAMPS
905
ASIC
CORE
COLUMNS REGISTERS (SEL SIGNAL)
CONTROL SIGNALS
906

SHARED READOUT MULTIPLE SPAD EVENT COLLISION RECOVERY FOR LIDAR

CROSS-REFERENCE TO RELATED APPLICATIONS

The present application claims priority to and the benefit of priority under 35 U.S.C. § 119 to U.S. provisional application Ser. No. 63/298,988, filed Jan. 12, 2022 entitled "SHARED-READOUT MULTIPLE-SPAD EVENT COLLISION RECOVERY FOR LIDAR", the entire content of which is incorporated herein by reference.

FIELD

The present disclosure relates generally to a method to detecting objects in LIDAR systems. In particular, a method of detecting photons by receiving pulses.

BACKGROUND

Single photon avalanche diodes (SPADs) may provide accurate photon arrival times. SPADs may be used for direct time-of-flight (dTOF) light/photon detection and ranging (LIDAR) sensors. Signals from one or more SPADs may be processed into binary square pulses. These signals may be fed to a time-to-digital converter (TDC) which may resolve timestamps from the signals to build a time-of-flight (ToF) histogram. The signals may be read for a number of cycles, and the histogram may be processed to measure the ToF. The photon detection by the SPADs may impact the LIDAR sensor accuracy and precision due to SPAD dead time. Current methods use significant energy and area to achieve accuracy and precision. There exists a need to have an accurate and precise LIDAR sensor with less energy and area.

The above information disclosed in this Background section is for enhancement of understanding of the background of the present disclosure, and therefore, it may contain information that does not constitute prior art.

BRIEF DESCRIPTION OF THE DRAWINGS

FIG. 3 depicts a timing diagram of an example ToF sensor of an example embodiment.

FIG. 5 depicts an example logic of a circuit that may be used in an example embodiment.

DETAILED DESCRIPTION

Figure 1:
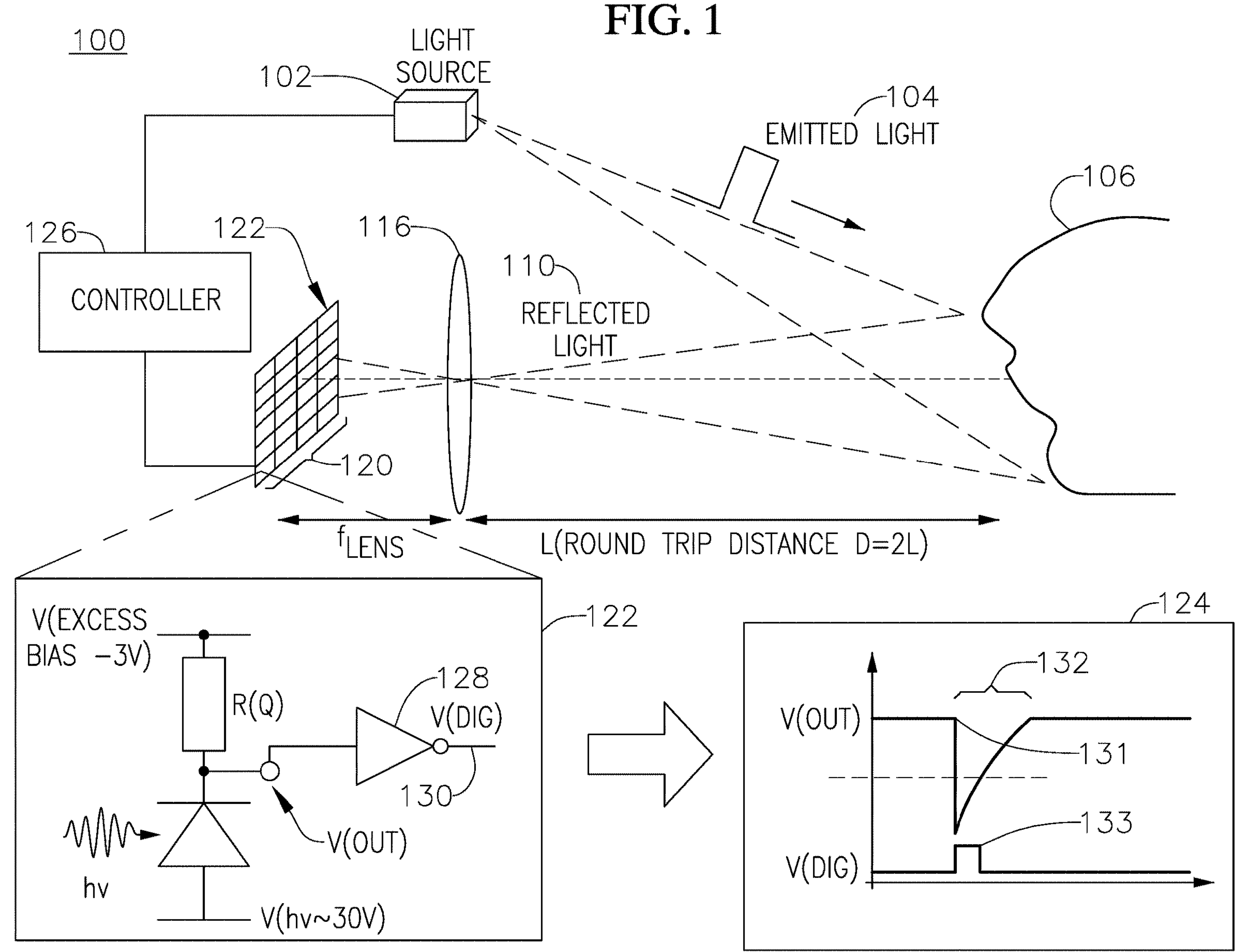
FIG. 1 depicts a diagram of an example ToF sensor.

Hereinafter, example embodiments will be described in more detail with reference to the accompanying drawings, in which like reference numbers refer to like elements throughout. The present disclosure however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein. The term "diameter" as used herein may refer to the diameter of a circular or spherical shape, or the equivalent diameter of a non-circular or non-spherical shape.

FIG. 1 depicts a diagram of a related-art ToF sensor system 100. A light source 102 may emit light 104 onto an object 106. Light source 102 may be a laser or other light source. Emitted light 104 may be a pulse or series of pulses. Emitted light 104 may have a pulse width. The pulse width may be predetermined. It may be a square wave with a rising edge, plateau, and a falling edge. Light 104 may reflect off of object 106 and may be reflected as a light 110. The distance from the light source 102 to object 106 may be L, which may be approximately the distance between the lens 116 and object 106. Reflected light 110 may enter a lens 116 and then may be received by a photodetector circuit array 120. The distance between the photodetector circuit array 120 and the lens 116 may be called a focal distance $f_{lens}$ and may be substantially less than the distance L. Therefore, for the purpose of this disclosure, the focal distance $f_{lens}$ may be ignored and the distance between photodetector circuit array 120 and object 106 may be substantially equal to the distance between light source 102 and object 106.

Photodetector circuit array 120 may comprise of single-photon avalanche diodes (SPADs), photodiodes (PDs), or other light-sensitive photodetectors. Photodetector circuit array 120 may comprise a single photodetector 122, or it may comprise N by M photodetectors 122, where N and M are any positive integer greater than 0. One or more photodetectors 122 may comprise a photodetector circuit, which will be described in more detail in FIG. 7. A controller 126 may control light source 102 and photodetector circuit array 120. A photodetector 122 in photodetector circuit array 120 is shown in more detail and will be discussed below.

A photodetector 122 may be one or more SPADs. Photodetector 122 may be a SPAD coupled to a quenching circuit R(Q) and may also be coupled to an analog-to-digital voltage converter, shown as an inverter 128, coupled between the SPAD and quenching circuit. There may be a readout 130, which may send channel data from photodetector 122 to a processor controller 126 or other processor. A graph 124 depicts a photodetector 122 receiving a photon. When a photon is received at a time 131, a large voltage drop on V(OUT) may occur and then the voltage may return to a steady state voltage with the quenching circuit. A digital waveform, which may be known as signal 133, may be output from the analog to digital converter as a response to the avalanche breakdown occurring in the diode of photodetector 122.

A SPAD-type photodetector 122 may perform quenching 132 after detecting a photon. Quenching may be a time period during which the SPAD cannot detect photons. Quenching may be referred to as "dead time." During dead time, earlier arriving photons may trigger the SPAD, which may make the SPAD unable to detect later arrived photons until the reverse bias is restored. This phenomenon may be referred to as "pile-up." Pile-up may reduce the photon detection rate, signal-to-noise (SNR) ratio, and may make the measured pulse shape deviate from the actual pulse shape.

The accuracy and precision of a ToF LIDAR system may be limited by pile-up, which may be due to lowered signal-to-noise ratio and distorted pulse shape measurement. In order to alleviate pile-up, active quenching may be used to decrease the dead time. Active quenching may require complex circuitry that may take up a lot of physical space on a chip.

Alternatively, pile-up may be alleviated by combining or merging multiple SPAD signals. A SPAD signal may be transformed into a sequence of binary square pulses. Signals from a single SPAD may first be transformed into binary square pulses, such as in graph 124. These signals may then be combined or merged using functions such as OR, XOR, or summation (not shown). Using an OR function to combine signals may lead to an event collision where one more SPADs may be triggered at the same time and only one event may be recorded. Using an XOR function may combine signals and may preserve the count of events, however, the output timestamps may not be an accurate representation of the event time. There may be further processing needed, which may lead to longer delays for detecting events in sensor 100. Lastly, summation may be used, but it may require extra bits or readout lines to encode data beyond binary representation. There exists a need for a function that takes into account event collision and provides collision recovery, and for a circuit that is less complicated and takes up less area.

Figure 2:
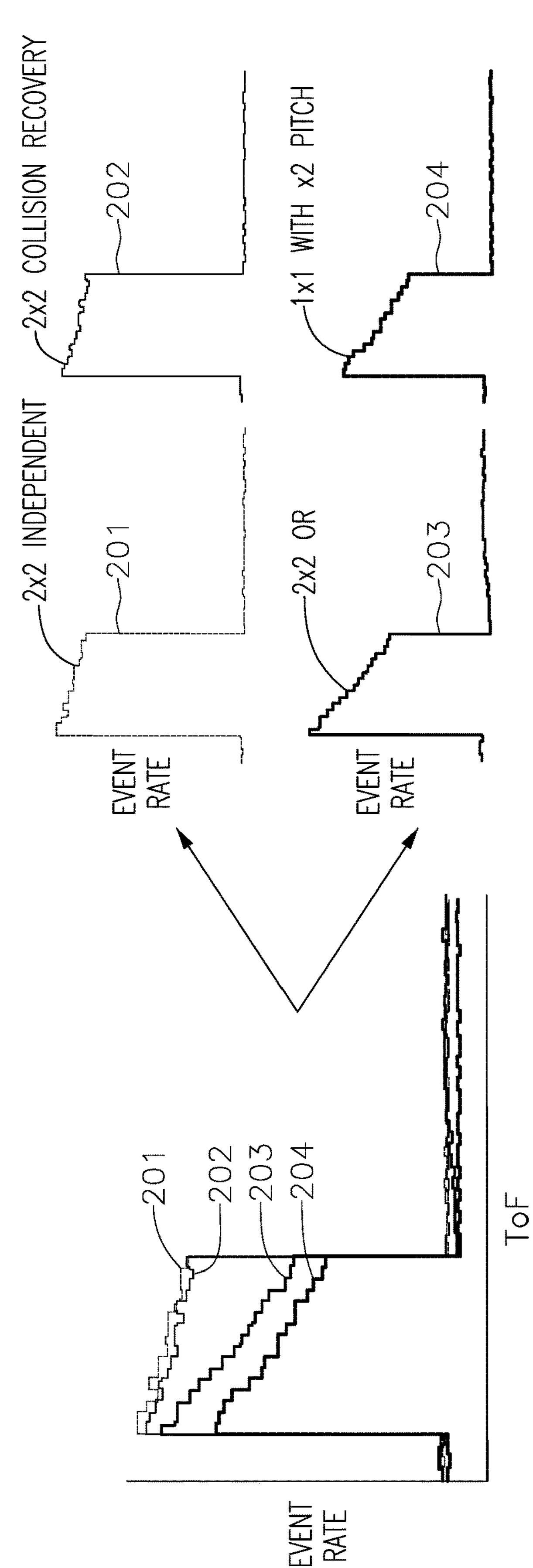
FIG. 2 depicts a comparison diagram of a laser pulse estimation in accordance with the teachings of an example embodiment.

FIG. 2 depicts a comparison diagram 200 of a laser pulse estimation mechanism. Data 200 may be the reconstruction of a square wave transmitted by light source 102 and received by photodetector circuit array 120. There may be a time of flight measurement on the x-axis, which may be a unit of time. There may be an event rate unit on the y axis, which may be a voltage or a count of photons received, or may be another unit.

Each ToF sensor may utilized a different photodetector circuit array 120, which may be the same as or different than that shown in FIG. 1. Data 201 may represent a square wave estimation where the photodetector circuit array 120 configuration may be a 2 by 2 SPAD photodetector array that record independently and data may be processed for each photodetector or group of photodetectors 122 to determine the results, that is, there may not be a shared readout line for the SPADs and each SPAD may have its own shared readout line. The shared readout line will be discussed in subsequent figures. Data 202 may represent a square wave estimation where the photodetector circuit array 120 configuration may be a 2 by 2 SPAD photodetector array with collision recovery. Collision recovery as disclosed herein will be described in more detail in subsequent figures. Data 203 may represent a square wave estimation where the photodetector circuit array 120 configuration may be a 2 by 2 SPAD photodetector array using OR logic and a shared readout line, without collision recovery. OR logic may be any circuit that equivalently performs the OR operation. Data 204 may represent a square wave estimation where the photodetector circuit array 120 configuration may be a single SPAD photodetector.

Example embodiments, which will be described in subsequent figures in more detail, may use data 202 which may approximately recreate the waveform emitted by the light source 102, which in the current example may be a square wave. Data 201 may recreate the waveform emitted by the light source 102 but may use more readout lines in its hardware design, which may lead to a larger footprint and bulkier form factor. Data 202 may approximately recreate the waveform emitted by the light source 102 and may use one readout line along with collision recovery, which may reduce the footprint and overall form factor of the hardware implementation. Data 203 may use the same number of SPADs as used in data 202, however, it may suffer from a stronger pile-up without collision recovery and therefore the square wave representation may be more distorted. Data 204 may be a single SPAD that may suffer from stronger pile-up. Data 202 is discussed in more detail below.

FIG. 3 depicts a timing diagram 300 of an example ToF sensor according to present teachings. In the example, there may be three SPADs (photodetectors 122) in photodetector circuit array 120. In other embodiments, other numbers and types of photodetectors 122 may be used. Each SPAD may have an output channel. When a photodetector 122 detects a photon, there may be a pulse in the output channel. The output channel associated with the photodetector 122 may generate a square pulse with a fixed width, but the pulse shape may be another shape. There may be a leading edge that indicates an arrival time of the photon, a pulse width representing the time the SPAD is activated, and a trailing edge that indicates the end of the photon detection event. Multiple channels may be combined using OR logic, and further processing logic may be used, which will be described below and in subsequent figures.

In timing diagram 300, there is an example photodetector circuit array 120 with three SPADs, which have three channels 301, 302, and 303. There may be an "OR resulting" channel 304, where the logical OR operation is applied to channels 301 to 303. A pulse in channel 301 may be represented with a first leading edge 306, a pulse width 305 (which may be referred to as w), and a first trailing edge 307. First leading edge 306 and trailing edge 307 may have timestamps indicating the arrival time of a first photon and the ending time of the first photon detection event, respectively. Channel 302 may have a pulse with a second leading edge 308 and a second trailing edge 309. Second leading edge 308 and trailing edge 309 may have timestamps indicating the arrival time of a second photon and the ending time of the second photon detection event, respectively. Channel 303 may have a similar output of a pulse width w and leading and trailing edges (not labelled).

Channels 301-303 may be digital conversions of an analog signal. There may be a dead time associated with each photodetector 122 in each channel 301-303. As described in FIG. 1, a photon may arrive at a time 131 and there may be a pulse waveform at each photodetector 122 with a channel output having a pulse width 133, which may include dead time 132 as shown in graph 124. Referring back to FIG. 3, there may be a dead time 313. During the dead time 313, the photodetector may not respond to another photon. To compensate for the dead time, there may be more than one channel. In the example in FIG. 3, there may be three channels. Combining more than one channel with a logical OR operation may overcome some of the limitations of dead time within one channel. More specifically, if a first photodetector 122 of photodetector circuit array 120 is experiencing dead-time, other photodetectors 122 of the photodetector circuit array 120 may still respond to incident photons, producing a signal that is combined ("OR") with the first photodetector 122's signal.

Channel 304 may show a combination of channels 301-303 using OR logic. The combined pulse may have a combined leading edge 310 and a combined trailing edge 311, which may be referred to as t1 and t2, respectively. For the first pulse event, the combined leading edge 310 may have the same timestamp as second leading edge 308. The combined trailing edge 311 may have the same timestamp as first trailing edge 307. That is, the leading edge timestamp of the first photon that arrived and the trailing edge timestamp of the last photon that arrived is recorded. Based on at least two photon arrival events have an overlapping time period, the combined OR pulse may capture the earliest and latest photon arrival. Based on there being two or more pulses in the receiving channel, the combined pulse width may be equal to (based on the arrival times are identical) or greater than (based on the arrival times are not identical) the original pulse width 305.

By using the information of the pulse width 305, the arrival time of the first and last photons may be calculated. The first photon arrival time may be the combined leading edge 310, which may be equal to the second leading edge 308 in the example in timing diagram 300. The last photon arrival time may be calculated by subtracting the pulse width 305 from the combined trailing edge 311, which may be the first leading edge 306 in the example in timing diagram 300.

To summarize, based on the combined trailing edge 311 minus the combined leading edge 310 being greater than the pulse width 305 ($t2-t1>w$), the logic 300 may return two timestamps: the first photon arrival time (in this case, second leading edge 308), and the last photon arrival time (in this case, first leading edge 306). This may be known as collision recovery.

Based on the combined trailing edge 311 minus the combined leading edge 310 being less than or equal to the pulse width 305 ($t2-t1<=w$), only one timestamp may be returned. For example, third channel 303 may have a third leading edge timestamp 312. There may be no overlapping leading edges and pulses in channels 301 and 302 during that time period. Therefore, the resulting leading edge using the OR logic and additional conditional recovery logic may only return one timestamp, which may be leading edge timestamp 312.

Figure 4:
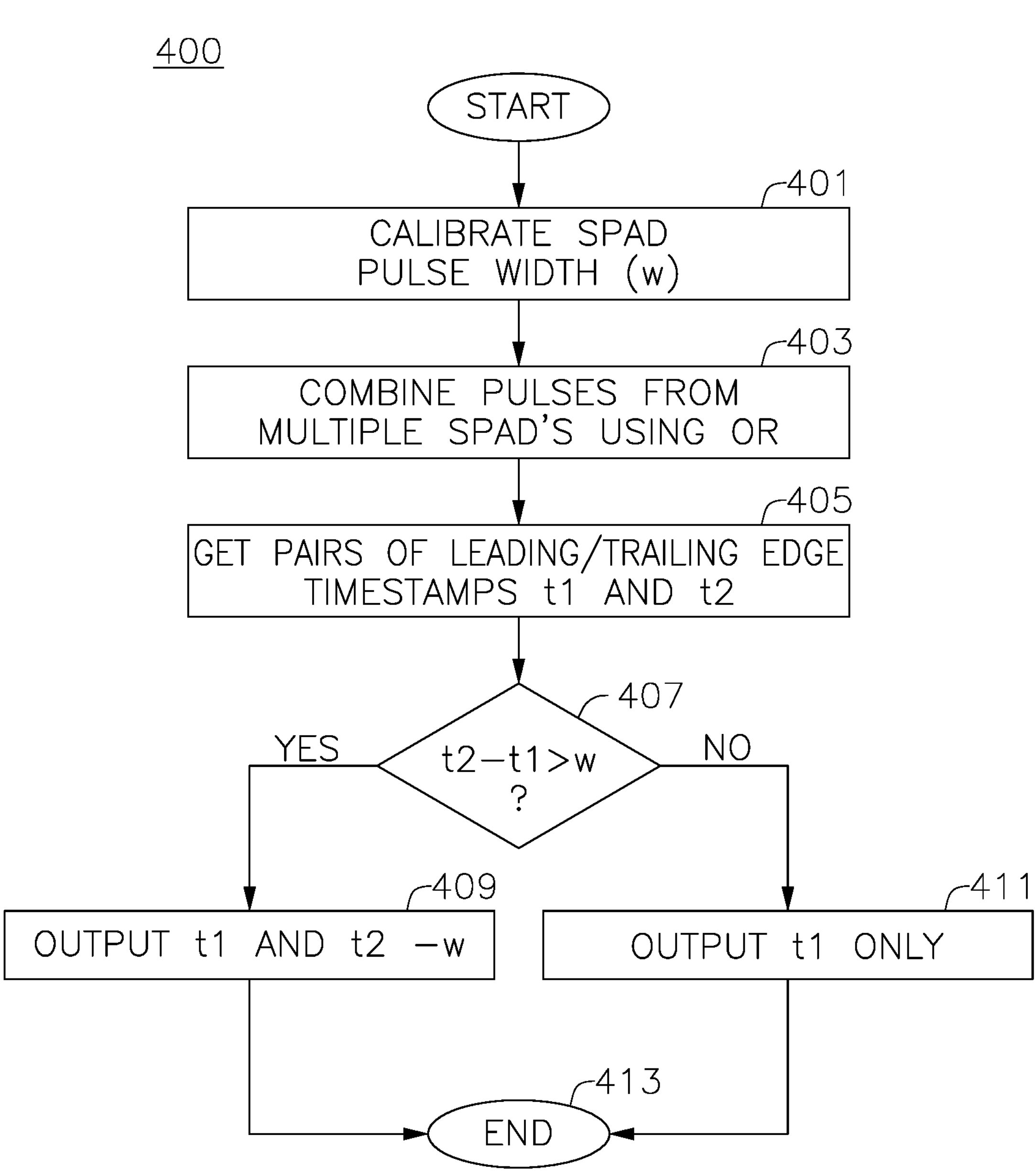
FIG. 4 depicts an example method of calculating ToF in accordance.

FIG. 4 depicts an example method 400 of calculating ToF, which may employ the collision recovery technique mentioned previously. Blocks 401-413 in method 400 may occur in any order and even in parallel. Moreover, blocks may be added to or removed form method 400 in accordance with the teachings of the present disclosure.

Block 401 shows a calibration of a pulse width 305 for a photodetector 122 in a photodetector circuit array 120. In one embodiment, the pulse may be a SPAD pulse output. Calibration may be predetermined at the time of designing ToF system. A pulse width w may be determined for a light source. The pulse width w may be determined in the design of a system. The pulse width may be wide enough to be captured by photodetector 122 in a photodetector circuit array 120. The pulse may be an analog pulse and then may be turned into a digital pulse.

A pulse width may be in the range of 1 picosecond to 1 microsecond. A pulse in block 401 may be a square pulse, which may have leading edge and a trailing edge. The leading edge may have a timestamp and the trailing edge may have a timestamp associated with it. The pulse width may be fixed. The calibrated pulse width may be used in each channel. There may be one channel per photodetector 122.

Block 403 shows combining multiple channels together using OR logic. Channels that are combined together may become a resulting channel. For example, as shown in FIG. 3, there is an example of three channels 301-303 and one resulting channel 304. In other embodiments, there may be one or more channels used to create the combined channel. Multiple pulses may be combined together with an OR logic due to compensate for the dead time of a single SPAD, as described previously. The signals are combined together. The result may be a more accurate detection of photons.

Block 405 shows getting the leading and trailing edge timestamps t1 and t2, respectively, of the pulses contributing to the combined pulses in the combined channel formed from block 403. For each pulse in the resulting channel, there may be a leading edge timestamp that may represent the arrival time of the first photon and there may be a trailing edge timestamp that may represent the ending of the arrival time of the last photon. There may be one or more photon arrivals for each pulse.

In block 407 the logic may subtract the timestamp of trailing edge of the combined channel pulse to the leading edge of the combined channel pulse and check if it is greater than the pulse width, as shown in the comparison equation below:

$$(t2-t1)>w$$

Based on determining a difference between the trailing edge timestamp t2 and the leading edge timestamp t1 being greater than w, the logic of block 409 is performed. Based on determining a difference between the trailing edge timestamp t2 and the leading edge timestamp t1 being less than or equal to w the logic of block 411 is performed.

Block 409 shows the output logic of block 407 based on determining a difference between the trailing edge timestamp t2 and the leading edge timestamp t1 being greater than w. The values for the leading edge timestamp t1 and the difference between the pulse width and trailing edge timestamp (t2−w) may be returned.

Block 411 shows the output logic of block 407 based on determining a difference between the trailing edge timestamp t2 and the leading edge timestamp t1 being less than or equal to w. The values for the leading edge timestamp t1 may be returned.

Block 413 shows the end state of the example method 400. The returned timestamp or timestamps may be used to build a histogram that may be used to determine the distance L in FIG. 1. By returning two values (when applicable) there may be more accurate estimation of the distance L.

FIG. 5 depicts an example logic 500 of a circuit that may be used in example embodiments. There may be a first photodetector 501, which may include a photodetector and quenching circuit. In one embodiment, first photodetector may be a SPAD, however, it may be a photodiode or other photodetector. Similarly, there may be a second photodetector 502, third photodetector 503, and fourth photodetector 504. Photodetectors 501-504 may be combined using OR logic gate 505. In one example, photodetectors 501-504 and gate 505 may be used in the implementation of timing logic 300 of FIG. 3. There may be a shared readout line 506 which may be the output from gate 505.

When a photon arrives at first photodetector 501, it may trigger an avalanche breakdown which may cause a surge of current through the diode. The quenching circuit may convert the current pulse into a voltage pulse. The quenching circuit may also reduce or eliminate the avalanche breakdown from continuing and reset the first photodetector 501 back to its initial state. The same process may occur at photodetectors 502-504. Voltage pulses generated from photodetectors 501-504 may be inputs to the OR logic gate 505. The OR logic gate 505 may be shared among all photodetectors 501-504, and it may combine individual pulses into a single output.

Figure 6:
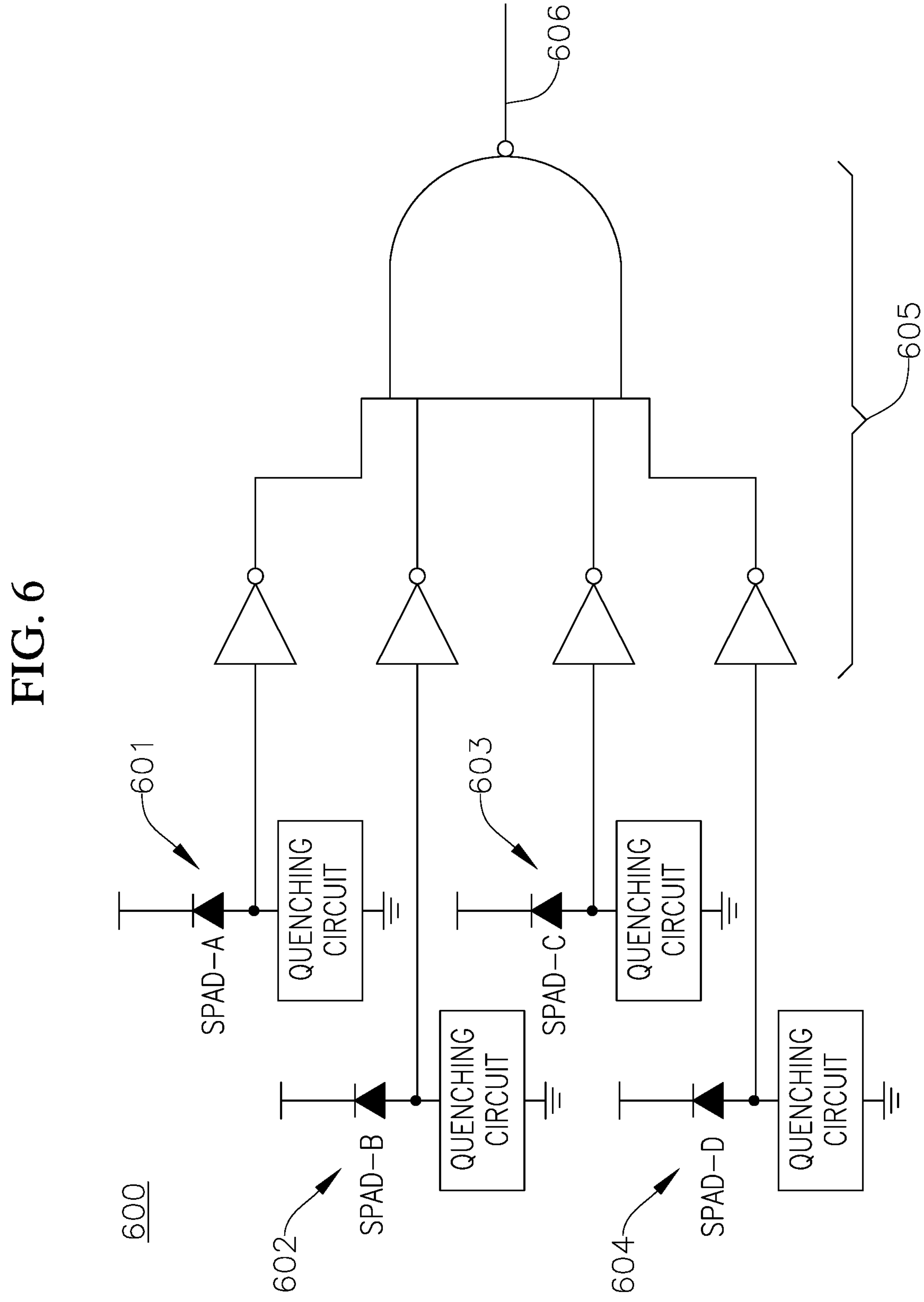
FIG. 6 depicts an example alternate logic of a circuit that may be used in an example embodiment.

FIG. 6 depicts an example alternate logic 600 of a circuit that may be used in example embodiments. There may be photodetectors 601-604, which may be SPAD, photodiode, or other photodetectors. Photodetectors 601-604 may have quenching circuits. Photodetectors 601-604 may have inputs to an OR equivalent logic gate 605. OR equivalent logic gate 605 may be any equivalent logic that may result in OR logic. For example, the OR gate 505 of FIG. 5 may be replaced as the logic gate 605 in FIG. 6 as NAND gates and inverters. There may be other equivalent OR logic not shown.

Although the examples in FIGS. 5 and 6 show four input photodetectors into a shared OR gate, there may be any number of photodetectors with their pulses inputted and merged into one output using an OR logic operation.

Figure 7:
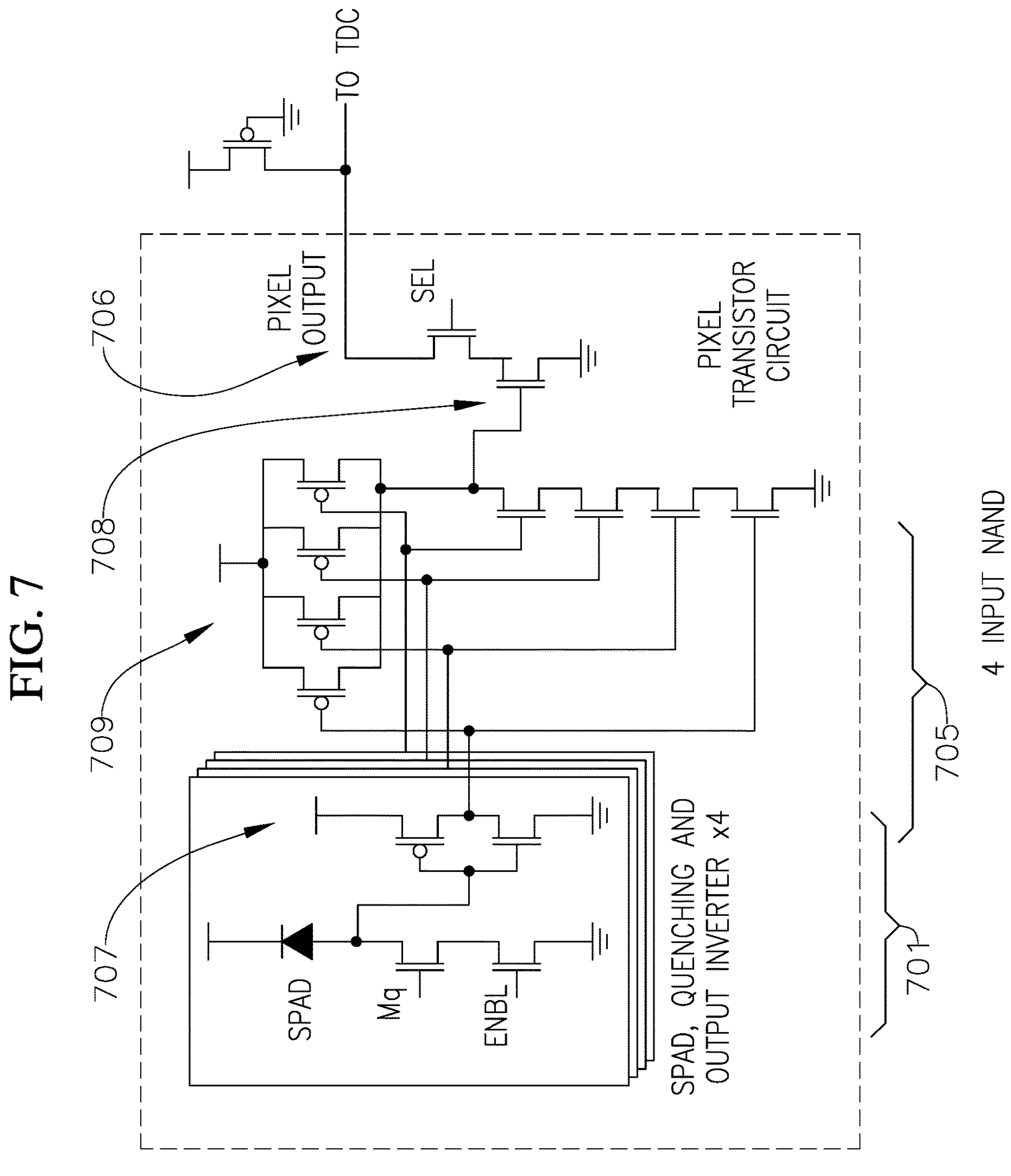
FIG. 7 depicts a circuit which may be a detailed implementation circuit of FIG. 6.

FIG. 7 depicts circuit 700 which may be a detailed implementation circuit of FIG. 6. Photodetector circuit 701 is shown as four photodetectors. In one embodiment, circuit 701 may be ordered in a 2 by 2 array of photodetectors. That is, there may be a 2 by 2 arrangement of one photodetector each, for a total of four photodetectors in one circuit 701. Circuit 701 may be one pixel with four photodetectors. In another embodiment, circuit 701 may be four pixels with one photodetector per pixel which may be ordered in a 2 by 2 array of pixels. That is, there may be a 2 by 2 arrangement of pixels, wherein each pixel may have one photodetector. More generally, in one example, circuit 701 may be a group of photodetectors in one pixel. In another example, circuit 701 may be a group of pixels with one or more photodetectors per pixel.

For each photodetector in circuit 701, there may be a quenching transistor Mq and enable transistor ENBL connected in series which may serve as a resistive element connecting the photodetector and power source to ground. There may also be an inverter 707 connected at the output of each photodetector. When circuit 701 is not in use, the enable transistor ENBL may be turned off to conserve power. Equivalent OR logic gates 705 may include four input NAND gates 709 and four inverters 707. There may be an output of an OR gate 708 which may be the output of OR logic gates 705.

The OR logic gates 705 may be connected to an output bus 706 through an NMOS pulldown transistor and select transistor SEL.

Output bus 706 may be known as a shared readout line, that is, the readout of a photon detection event may be shared by all photodetectors in circuit 701 after being combined by OR logic gates 705. The signal may then flow to a time-to-digital converter (TDC) not shown.

Figure 8:
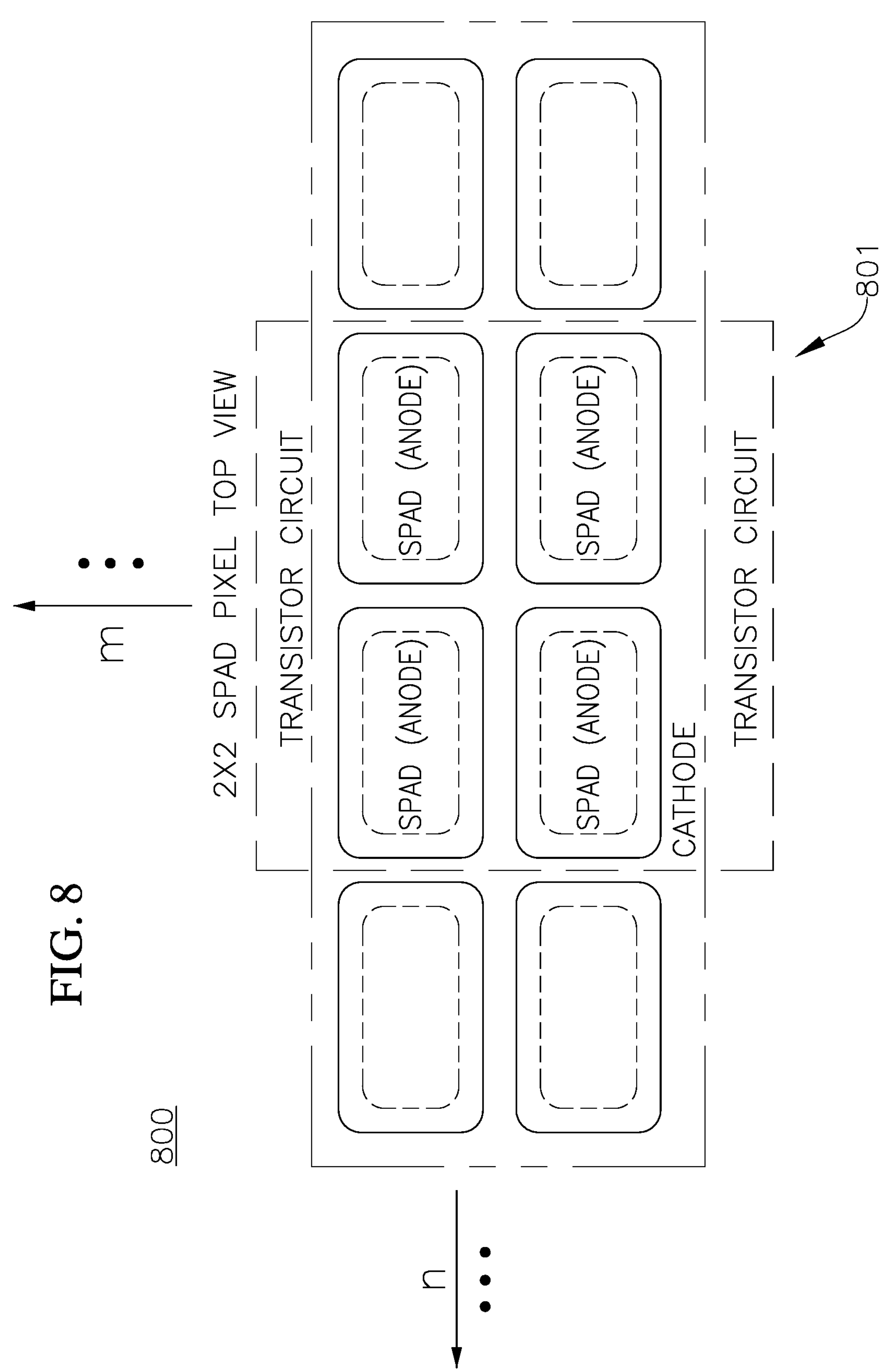
FIG. 8 depicts an example layout of photodetectors on a photodetector array of an example embodiment.

FIG. 8 depicts an example layout 800 of photodetectors on a photodetector array of an example embodiment. In one example, there may be a transistor circuit 801 that may comprise four SPADs arranged in a 2×2 array. There may be any number of SPADs within a circuit 701 and they may be arranged in an array format with n columns and m rows. In another embodiment, the photodetectors may be any other type of photodetector.

Figure 9:
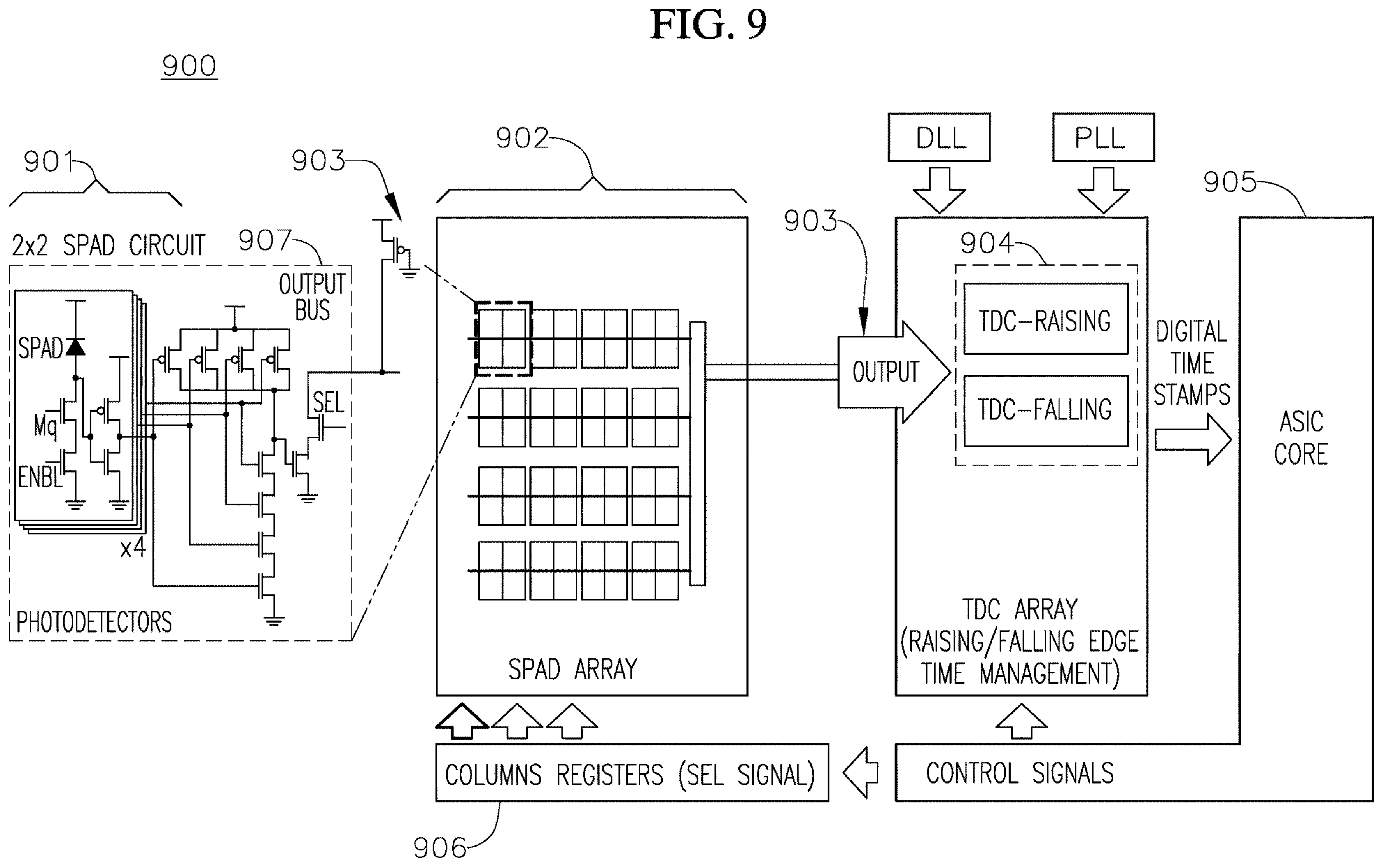
FIG. 9 depicts an example circuit of an example embodiment.

FIG. 9 depicts an example circuit 900 of an an example embodiment. There may be a photodetector circuit array 901 that receives analog signals from a light source (not shown). Photodetector circuit array 901 may comprise one or more photodetectors 122, associated OR logic, and photodetector output buses 907 to send data to a TDC array for further processing. Photodetector circuit array 901 may be comprised of M by N photodetectors circuits 902, where M and N are an integer value greater than or equal to 1. Photodetector circuit 902 may be comprised of M by N photodetectors and associated circuitry, where M and N are an integer value greater than or equal to 1.

In one embodiment, photodetector circuit 902 may be the design of circuit 700 in FIG. 7. In another embodiment, photodetector circuit 902 may comprise one or more photodetectors, which may be SPADs, photodiodes, or other detectors. An output bus 903 may extend across the photodetector array 901. Output bus 903 may comprise a shared readout line for each photodetector circuit 902. For each photodetector circuit 902 in photodetector circuit array 901, there may be an output bus 903 that may send data to a TDC module 904. TDC module 904 may compute the leading edge and trialing edge timestamps as described in FIG. 3 and FIG. 4.

In one embodiment, photodetector circuits 902 in the same row of photodetector array 901 may share the same output bus 903. There may be one output bus 903 per row of photodetectors in photodetector circuit array 901. In another embodiment, there may be one output bus 903 per photodetector group. For example, photodetector circuit 902 may be one group of photodetectors. In yet another embodiment, there may be another combination of photodetectors in photodetector circuit array 901 connecting to output bus 903.

Signals from one or more photodetector in photodetector circuit array 901 may be sent to TDC module 904 for processing. In one embodiment, there may be one TDC module 904 per output bus 903. During operation, a photodetector or photodetector circuit may be selected through a column shift register 906. A select SEL signal may be sent to the photodetector circuit array 901 to select a photodetector. The SEL signal may turn on select transistors within a photodetector circuit and may allow the selected photodetector output values to be sent to the output bus 903. The output pulses may be fed to the TDC module 904 where the pulses may be processed. An ASIC logic core 905 may store these timestamps for further analysis. ASIC logic core 905 may also control the operation of the TDC module 904 and column shift register 906.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims, and their equivalents.

What is claimed is:

1. A sensor, comprising:

a photodetector circuit array, comprising at least one photodetector circuit, wherein the at least one photodetector circuit comprises an array of photodetectors, wherein the at least one photodetector circuit further comprises one or more components configured to perform an OR logic operation for combining a pulse that has a pulse width equal to or greater than an original pulse width from the array of photodetectors;

a shared readout line for the at least one photodetector circuit; and a time to digital converter (TDC) array.

2. The sensor of claim 1, wherein the at least one photodetector circuit comprises an array of M by N photodetectors, where M and N are a positive integer wherein at least one of M or N is greater than 1, and wherein the shared readout line is shared by the array of M by N photodetectors of the at least one photodetector circuit.

3. The sensor of claim 2, wherein the photodetector circuit is one or more pixels.

4. The sensor of claim 2, wherein at least one photodetector in the photodetector circuit is a SPAD or photodiode.

5. The sensor of claim 2, wherein the at least one photodetector circuit further comprises OR logic or OR equivalent logic for combining a pulse from the array of M by N photodetectors.

6. The sensor of claim 1, wherein the photodetector circuit array comprises an array of M by N photodetector circuits, where M and N are positive integers and at least one of M or N is greater than 1, and wherein the shared readout line is shared by the array of M by N photodetector circuits of the photodetector circuit array.

7. The sensor of claim 6, wherein at least one photodetector circuit of the array of M by N photodetector circuits in the photodetector circuit array further comprises OR logic or OR equivalent logic for combining pulses from within the at least one photodetector circuit.

8. The sensor of claim 6, wherein the photodetector circuit array further comprises OR logic or OR equivalent logic for combining pulses from the array of M by N photodetector circuits.

9. The sensor of claim 1, wherein the TDC array further comprises one TDC per photodetector circuit.

10. The sensor of claim 1, wherein the TDC registers timestamps for a leading and trailing edge of a pulse.

11. The sensor of claim 1, wherein the photodetector circuit array comprises rows and columns of photodetector circuits, and wherein there is one shared readout line for each row of photodetector circuits in the photodetector circuit array.

12. The sensor of claim 1, wherein the at least one photodetector circuit in the photodetector circuit array comprises a plurality of photodetectors.

* * * * *